Patented May 30, 1944

2,349,904

UNITED STATES PATENT OFFICE 2,349,904

PROCESS FOR PREPARING CATALYTIC MATERIALS

Karl H. Hachmuth, Bartlesville, Okla., assignor to Phillips Petroleum Company, a corporation of Delaware No Drawing. Application December 17, 1940, Serial No. 370,558

11 Claims. (Cl. 260—683.15)

This invention relates to the preparation of a catalytic material for the polymerization of olefinic hydrocarbons which are normally gaseous at ordinary temperatures and pressures. More particularly it relates to the preparation of a catalytic material of the silica-metallic oxide type.

A catalytic material of the past can, as a rule, be placed in one of two broad groups: (1) a catalytic material which has substantially the same composition throughout, such as nickel, chromium oxide gel, intimate mixtures of two or more materials such as dried mixtures of precipitated hydrous metal oxides and the like, and (2) a catalytic material comprising a support which has deposited on it or is impregnated with a material which is catalytic or which can be treated to make it catalytic, the support at times acting merely as an inert material but often apparently acting as a promoting agent as well. A third type of catalytic material has recently come into importance which, although it apparently might be a member of the second group just mentioned, can be distinguished from the members of this group. In the preparation of this type of catalyst, an acid hydrogel such as silica gel, is first prepared, and before it is thoroughly dried or dehydrated it is treated with an aqueous solution of a suitable metal salt. While the resultant product, after washing and drying, appears to consist of or comprise a mixture of silica and an oxide of the metal of the metal salt solution, nevertheless, this product has not been prepared by precipitating a metal hydroxide or hydrous oxide upon an inert support, nor has a dried, inert support been impregnated with a metal salt which has been decomposed or from which a decomposable compound has been precipitated, as when thoroughly dried pumice or silica gel has been impregnated with aluminum nitrate and the resulting material calcined, or treated to precipitate aluminum as the hydroxide or carbonate or the like and subsequently calcined. Such catalytic materials comprising silica and various metal oxides have been described by Gayer (Industrial and Engineering Chemistry, 25, 1122), Perkins et al. (U. S. Patent 2,107,710), McKinney (U. S. Patents 2,142,324 and 2,147,985) and Fulton and Cross (U. S. Patents 2,129,649, 2,129,732 and 2,129,733). It is with such catalysts of the latter or third type that my invention is more particularly concerned.

In general, these catalysts are prepared by first forming a hydrous silica gel from an alkali-silicate and an acid, washing soluble material from the gel, treating or activating the gel with an aqueous solution of a suitable metal salt and subsequently washing and drying the treated material. In this manner, a part of the metal, presumably in the form of a hydrous oxide or loose hydroxide compound formed by hydrolysis is selectively adsorbed by the hydrous silica, and is not removed by subsequent washing. The most often used catalyst of this type, at present, is a silica-alumina catalyst, prepared by treating a wet or partially dried hydrous silica gel with an aluminum salt solution and subsequently washing and drying the treated material. However, catalysts of a very similar nature, but differing among themselves as to one or more specific properties, may be prepared by using, instead of an aluminum salt, a hydrolyzable salt of a metal selected from Group III B or from Group IV A of the periodic system and may be referred to in general as "silica-alumina type" catalysts. As listed in "Modern Inorganic Chemistry" by J. W. Mellor (Longmans, Green & Co. (1939), revised and edited by G. D. Parkes) on page 118 Group III B consists of boron, aluminum, gallium, indium and thallium, and Group IV A consists of titanium, zirconium, hafnium and thorium. More particularly, salts of indium and thallium in addition to aluminum in Group III B may be used, and salts of titanium, zirconium and thorium in Group IV A may be used to treat silica gel and to prepare catalysts of this general type. Boron in the form of boric acid, or a soluble borate such as sodium borate, may also be incorporated with silica gel. The catalysts so prepared are useful in processes for the polymerization of unsaturated organic compounds, especially for the polymerization of low-boiling olefin hydrocarbons in either gaseous or liquid phase, for the depolymerization of higher-boiling polymers, for the cracking and splitting of higher-boiling hydrocarbons to form lower-boiling hydrocarbons, for the isomerization of various hydrocarbons, for the hydrolysis of alkyl and aryl halides at elevated temperatures, for the addition of certain halogens and hydrogen halides to unsaturated compounds, for the splitting out of a hydrogen halide from an alkyl halide and the like. Whether prepared by this method or by some modification thereof, the catalyst will contain a major portion as silica, and a minor portion of metal oxide. The minor portion of metal oxide, such as alumina, will generally not be in excess of 10 per cent by weight, and will more often, and generally more preferably, be between about 0.1 and 1.5 or 2 per cent by weight.

In the preparation of such catalysts of the silica-alumina type on a commercial scale it has been found difficult to prepare numerous batches of catalysts which have consistent activities. In the use of such catalysts for the polymerization of low-boiling olefins it has been the practice to conduct the process to produce a certain extent or amount of polymerization and, as the catalyst becomes progressively deactivated and tends to effect less polymerization, to increase progressively the extent or amount of polymerization, produced by the less-active catalyst by increasing the polymerization temperature. In this way, although a less-active catalyst will effect a less amount of polymerization at a given temperature, the amount of conversion can be kept constant over a period of time by progressively increasing the temperature. However, since there is a more or less fixed maximum temperature, of about 550 to 650° F. above which it is not feasible to conduct the polymerization, it is of great advantage to start the use of a fresh catalyst at as low a polymerization temperature as possible, so that there will be a greater temperature range through which the polymerization temperature may be raised, and therefore a longer catalyst life. Since it has been found that when using a catalyst of the silica-alumina type to polymerize a mixture of gaseous olefins to produce motor-fuel, the octane number of the hydrogenated motor fuel product tends to decrease as the polymerization temperature increases, and the rate of catalyst deactivation tends to be less at lower temperatures, it is of added advantage to secure as much polymerization as possible at low temperatures and to initiate the polymerization at a low temperature.

I have found that catalytic materials with more consistent activities between various batches, and also with activities in general higher than the average activities of catalyst batches heretofore produced, can be produced by subjecting a hydrous silica gel to a plurality of activating treatments, each of said activating treatments being of the type as has just been briefly described, each such activating treatment being followed by a washing treatment to remove soluble ionic material. I have also found that the initial temperature at which such a catalytic material will actively effect a desired polymerization of low-boiling olefins is dependent upon the temperature at which the final drying or dehydration of the treated and washed silica-alumina type material is carried out, and that such a material, if thoroughly dried at a low temperature, will initiate a polymerization at a lower temperature than if the same material had been finally dried at a high temperature. While I have found that these two features, when used together in combination, will produce the most desirable result, either one when practiced alone will produce a result which is to be preferred over that disclosed by the teachings of the prior art. Thus, I have found that a catalyst of the silica-alumina type prepared by a plurality of activation treatments, but otherwise treated as known to the art, is superior to those previously prepared. I also have found that a catalyst of the silica-alumina type, subjected to a single activation and washing treatment, will initiate at a low temperature a desired polymerization of low-boiling olefins if finally dried at a low temperature in accordance with the present disclosure.

It is an object of this invention to provide a process for the preparation of a catalytic material suitable for the polymerization of normally gaseous olefinic hydrocarbons.

Another object is to provide a process for the preparation of a silica-alumina type of catalytic material of high activity.

Still another object is to provide a process for the production of an activated silica gel that has an exceptionally long life as a catalyst.

A further object is to provide a process for the preparation of a catalytic material which will initiate the polymerization of olefinic hydrocarbons at a relatively low temperature.

Another object of this invention is to provide a process for the preparation of a catalyst of the silica-alumina type which is of high catalytic activity and which is stable upon burning off deleterious carbonaceous deposits.

Further objects and advantages of this invention will be apparent from the accompanying disclosure.

In preparing a catalytic material according to my present invention, one may proceed as follows: A silicic acid gel is prepared by mixing a solution of a silicate with a dilute solution of a mineral acid. A wide range of concentrations of the constituents is permissible although in actual practice it has been found desirable to use a volume of dilute acid approximately equal to the volume of dilute silicate solution. The resulting mixture preferably should have a pH somewhat on the acid side. The mixture generally sets to a gel in about 2 to 12 hours, but the time required for setting in any particular case will vary with and will depend upon the concentration of the constituents, and upon the temperature of the mixture, etc., as is known to the art. After the gel has set it is allowed to age for a time, usually between four and twenty-four hours. After aging it is broken into pieces and washed to remove excess salt or acid. Forcing the material through a screen with holes about one inch in diameter is generally satisfactory. The time required for washing will vary with the size of the batch being washed. This wet material is dried until it occupies only a relatively small per cent of its original volume, usually between 15 and 25 per cent. The material is now sufficiently dry and hard so as to be comparatively easy to chip with the finger nail. In the practice of my invention I prefer to wash the material again, the time required being substantially less than the first washing, usually being from 1 to 12 hours. The water content of the gel is now quite uniform throughout. The gel need not be dried after the second washing but is now ready for activation. This brought about by treating the gel with a more or less dilute solution of a hydrolyzable salt of a metal of Group III B or IV A of the periodic system.

The activation treatment is primarily effected by contacting the silica gel with a solution of the desired salt. It may be accompanied by heating to a more or less elevated temperature by indirect heat exchange or direct injection of steam, or the like; by agitation of the mixture of solution and granular gel; by passing a stream of the treating solution through a stationary or moving bed of granular material, and by other similar mechanical manipulation. While it is not necessary to heat the mixture during treatment, the period of activation may be materially shortened by the use of an elevated temperature. Generally the temperature need not be above the ordinary boiling temperature of the treating solution, but higher temperatures may at times be used by conducting the treatment in a closed vessel under a suitable superatmospheric pressure.

The activating solution is removed and the treated gel is washed. After this operation I prefer to activate at least a second time, generally under conditions similar to those used during the first activation. This second activation may be performed with or without partial drying of the material from the first activation and the method is generally substantially the same as that used for the first activating process. The latter activating solution is drained and the gel washed and dried. As hereinbefore mentioned, the silica gel described in my process may be treated with an activating solution more than twice and as many times as is necessary for the preparation of a catalyst which is sufficiently active and which has a long life for polymerizing unsaturated hydrocarbons. In general, however, two such activating treatments are sufficient to result in a satisfactory catalyst.

In the modification of the invention, the final activation step is advantageously conducted in a manner similar to a washing step by passing a relatively dilute solution of a hydrolyzable salt of a suitable metal through a bed of the granular material contained in a suitable tank. This solution may be more dilute than was used in the first activation, and may vary from about 0.05 to 0.1 molar. In any one of the treating steps, or washing steps, it has sometimes been found desirable to recirculate a substantial part of the effluent of the treating solution in order that this operation can be performed economically and so that the gel will be treated uniformly, as disclosed in the copending application of Hendrix and Chapman, Serial No. 371,209, filed December 21, 1940.

Before this satisfactorily activated material will function as a polymerization catalyst it must be more or less completely dehydrated. I have found that the temperature of dehydration affects the temperature at which subsequent polymerization can be effected. In order for polymerization to take place at a low initial temperature not only must the water content of the catalyst be low but the catalyst must also have been dehydrated at a low temperature. As discussed in my copending application Serial No. 333,872, filed May 7, 1940, it is desirable to use such a catalyst under constant-conversion conditions, initially starting the polymerization at as low a temperature as a satisfactory conversion can be obtained, and increasing the conversion temperature as the activity of the catalyst decreases to maintain the extent of conversion relatively constant. I have found that in using this catalyst under such conditions, polymerization at a satisfactory rate will begin at about the highest temperature at which the catalytic material was finally dehydrated. That is, if I remove substantially all of the water of hydration from the activated gel at a temperature of about 200 to 225° F., the catalyst so prepared will usually begin to promote a desired polymerization of low-boiling unsaturated hydrocarbons passed thereover at a temperature in the neighborhood of 200 to 225° F. The upper limits for conducting satisfactory polymerization of low-boiling olefin hydrocarbons to hydrocarbons in the motor-fuel boiling range is more or less fixed at about 550 to 650° F. Also, motor fuel resulting from high-temperature polymerization has a generally lower octane number than motor fuel resulting from lower-temperature polymerization. Therefore, in view of these upper polymerizing temperature limits and my newly found correlation between temperature of dehydration of a polymerization catalyst and initial polymerizing temperatures, it is obvious that the lower the temperature of initial polymerization the greater the temperature range through which polymerization can be conducted and therefore the longer the life of the catalyst, and the higher the octane number of the product obtained on hydrogenation of the total polymeric product having a boiling range within the motor-fuel boiling range. The process for the preparation of such a catalyst is one of the important objects of my invention.

Although it is generally preferable, in order to obtain the most desirable catalytic material, that none of the drying should be carried out at a temperature exceeding the final dehydration temperature, it is sometimes more expedient to conduct the initial part of the dehydration, following the final activation, at a temperature of the order of about 250 to 300° F. in order to remove a large part of the water rapidly. This is often done by placing the granular material, after the final activation and washing, in a suitable drying tower and passing flue gases at a desired temperature over it. While the material still contains 10 to 20 per cent of water, by weight, it is then cooled somewhat and removed to the conversion chamber, wherein the final dehydration is carried out at as low a temperature as possible, as discussed, generally by passing an inert low-boiling hydrocarbon material such as methane, ethane, propane, or the like, through the catalyst mass at a suitable temperature. I have obtained satisfactory operation by passing the polymerization charge through the catalyst mass at a suitable temperature whereby this charge stock acts as a dehydrating agent and polymerization is initiated as dehydration becomes complete. I prefer that this final drying be carried out below 225° F., but in some instances drying may be expedited, without too great a loss in initial activity, at a slightly higher temperature, such as up to about 250° F.

It has been previously disclosed by other workers in this field that such catalysts as have been disclosed by the art will promote polymerization of olefins at temperatures as low as 75 to 100° F. without following the procedure disclosed herein. While such a result can be obtained when dealing with high concentrations of quite reactive olefins such as isobutylene or isoamylenes, these same catalysts require much higher temperatures for satisfactory operation when an ordinary charge stock containing 15 to 30 or 40 per cent olefins, a considerable part of which are straight-chain olefins, is treated to produce olefin polymers. It is when such operating conditions are employed that the benefits of following the present disclosures are obtained. While the temperature of initial polymerization may be realized at about 175° F. or lower with these charge stocks when catalysts of the silica-alumina type are completely dehydrated at these lower temperatures, such dehydration generally requires an uneconomically long time, and the best over-all results are to be realized when the catalyst is prepared so that the polymerization will be initiated at a temperature within the range of about 200 to 225° F.

As an example of one modification of my invention, a satisfactory silicic acid gel was prepared by first diluting 50 gallons of 66° Bé. sulfuric acid with a sufficient amount of water so that there resulted approximately 350 gallons of solution. To this was added with stirring a dilute sodium silicate solution made by mixing 240 gallons of water with 160 gallons of 41° Bé. water glass solution. The resulting mixture had a pH substantially below 7 and set to a gel within a few minutes. The gel was then allowed to age for 12 hours, after which time it presented a jelly-like appearance. It was cut or broken into pieces of a size adapted to pass through a screen with 1 inch holes and washed with hot water to remove excess salt and acid. Washing was continued until the acidity of the wash solution had decreased to a pH between 2.0 and 2.5. This washing operation usually requires about 15 hours. The mass of material was dried for 3 or 4 days at a temperature of 160–180° F. or until the material was dry to the touch or until it consisted of only 15 to 25% of its original volume. It was washed again and this time the washing was continued to a pH between 3.0 and 3.5 with hot water. This second washing operation required approximately 6 hours and was carried out in much the same manner as the first washing.

The gel was not dried for subsequent treatment but was substantially free from ionic material and ready for activation. Activation of the hydrous silica gel was accomplished in the following manner: The mass of hydrous gel, in a suitable wooden tank, was covered with 0.2 molar aluminum sulfate solution and the mixture was heated until it reached the boiling point. The temperature was kept very near the boiling point for two hours while the mixture was stirred occasionally. The activating solution was then allowed to drain, after which the resulting material was washed for about eight hours with hot water. After washing, the activated gel was not dried but was subjected to another activating process using substantially the same materials and methods as was used in the first one. After draining the activating solution and washing the material with hot water, the material was dried to a water content of about 21 per cent by subjecting it to a flow of flue gases at a temperature of about 250° F. for 1 to 2 days.

The twice activated gel can be further dehydrated at a low temperature by passing a dry gas such as nitrogen, methane, ethane or propane or the like over the impregnated gel at a low pressure and at a temperature of between 175 to 220° F. for several hours. The activity of the catalyst as prepared above was rated according to the volume of polymer liquid produced, collected at 0° C., when pure propylene was passed over a portion of the catalyst granules under standardized conditions of temperature, pressure and flow rate. The advantage in using at least two activation steps in my process will be apparent from the table which follows.

| Silica Gel | Polymer produced—Cumulative cubic centimeters at the end of X hours from the start of the test | | | |
|---|---|---|---|---|
| | 1 hour | 2 hours | 3 hours | 4 hours |
| After single activation with Al$_2$(SO$_4$)$_3$ | 1.8 | 2.3 | 3.5 | 4.5 |
| After double activation with Al$_2$(SO$_4$)$_3$ | 1.8 | 3.5 | 5.5 | 7.0 |

From the above table it is readily seen that double activation of a silica-gel increases the total volume of liquid polymer that can be obtained over a four-hour test run. The twice-activated silica gel not only exhibits high activity as a catalyst but it has a surprisingly long life as well. These two attributes are not necessarily found together in the same catalyst, and it is an advantage of my invention that they can be produced together rather consistently.

However, as I have stated elsewhere in this specification, I am in no way limited to two activation steps in the preparation of my silica-alumina catalyst. The silica gel described above may be subjected to multi-activation treatment, the number of times of activation being determined by the maximum activity and life afforded by the resulting catalyst in the polymerization of unsaturated hydrocarbons, and by the economic advantages of additional activation steps.

When a hydrocarbon mixture containing gaseous olefins, such as propylene and/or butylene, is passed in liquid phase over the catalyst mass under a suitable pressure, polymerization of the olefins to polymers within the motor-fuel boiling range begins at a temperature of about 180 to 220° F., that is, at about the temperature at which the dehydration of the activated gel was completed.

I have also practiced my invention by placing the activated gel containing water retained after the hereinbefore-described drying treatment into a polymerization chamber and passing a polymerization charge stock over it at a polymerization pressure and at 180 to 210° F. This charge stock then effected a removal of water from the partially hydrated activated gel. When the water content of the catalyst was sufficiently low, polymerization of olefins was initiated in this same temperature range, the end of the drying period and the start of the polymerization period shading into each other without raising the temperature. The water so removed from the catalyst was usually trapped in the debutanizer or otherwise vented from the system. While it is not known exactly what is the water content of the material which actually acts as the polymerization catalyst under such conditions, since in plant practice the catalyst is not removed without a preliminary steaming to prevent fires, it is reasonably assumed from other data that the water content is not in excess of about 6 to 8 per cent, and probably is somewhat greater than 3 or 4 per cent. A water content of the final catalytic material of about 5 per cent has been found to exist in similar catalytic materials.

Although it is generally more convenient to use a solution of the same salt in subsequent activation treatments as was used in the first activation treatment, it is not always a necessary part of the process of my invention to do so. However, for the most part, the catalysts prepared by my invention should contain only one metal compound hydrolytically adsorbed on the hydrous silica gel, so that I prefer in all cases to use a salt of the same metal in the various activations which are a part of the preparation of any particular mass of catalyst. The salts themselves may be different, for example, the first activation may be with aluminum sulfate and the final activation of the same mass of gel may be with aluminum chloride. Often it is preferable to use a nitrate or a chloride, or the like for the final activation, so that any acid residue which may not be removed by subsequent washing will have sufficient volatility to be eventually removed by subsequent heating at elevated temperatures. The same applies to salts of metals other than aluminum of Groups III B and IV A of the periodic system, and in fact to any catalysts prepared by the hydrolytic adsorption of a metal or metal compound from solution upon a hydrous silica gel, although such are not complete equivalents of each other.

It is to be understood that various specific limitations and preferred arrangements and modifications discussed are not to be considered unduly limiting, and that various modifications can be applied without departing from the spirit of the disclosure. As stated herein, catalysts of this type prepared by the invention may be used also for various other processes than olefin polymerization.

I claim:

1. In a catalytic process for the polymerization of low-boiling olefin hydrocarbons heavier than ethylene, the improvement which comprises preparing a hydrous gel of silicic acid, treating said hydrous gel at least twice with an aqueous solution of a hydrolyzable salt of a metal selected from Groups III B and IV A of the periodic system, subsequent to each such treatment washing said treated gel with water to free it substantially of soluble ionic material, and finally drying said gel at a temperature not substantially higher than approximately 225° F. and to a water content such that the resultant material is adapted to polymerize low-boiling olefin hydrocarbons heavier than ethylene when present in a hydrocarbon mixture in a concentration between 15 and 40 per cent at a temperature between approximately 200° and approximately 225° F., and subsequently passing a hydrocarbon material containing low-boiling olefins heavier than ethylene, in an amount between 15 and 40 per cent thereof, over said catalyst at an initial polymerization temperature not higher than approximately 225° F.

2. In a catalytic process for the polymerization of low-boiling olefin hydrocarbons heavier than ethylene, the improvement which comprises preparing a hydrous acidic silica gel, treating said hydrous gel with an aqueous solution of a hydrolyzable salt of a metal selected from Groups III B and IV A of the periodic system, washing said treated gel with water, subjecting said washed gel to a second treatment with an aqueous solution of a hydrolyzable salt of said metal, washing said twice-treated gel substantially free of soluble ionic material, subjecting the resultant material to a preliminary drying at a temperature not substantially higher than approximately 225° F., and subsequently passing over said partially dried material in a polymerization catalyst chamber at a temperature not higher than approximately 225° F. a hydrocarbon charge stock comprising between 15 and 40 per cent of low-boiling olefin hydrocarbons to complete said drying and to initiate said polymerization.

3. In a catalytic process for the polymerization of low-boiling olefin hydrocarbons heavier than ethylene, the improvement which comprises preparing a hydrous gel of silicic acid, treating said hydrous gel at least twice with an aqueous solution of a hydrolyzable salt of aluminum, subsequent to each such treatment washing said treated gel with water to free it substantially of soluble ionic material, and finally drying said gel at a temperature not substantially higher than approximately 225° F. and to a water content such that the resultant material is adapted to polymerize low-boiling olefin hydrocarbons heavier than ethylene when present in a hydrocarbon mixture in a concentration between 15 and 40 per cent at a temperature between approximately 200° and approximately 225° F., and subsequently passing a hydrocarbon material containing low-boiling olefins heavier than ethylene, in an amount between 15 and 40 per cent thereof, over said catalyst at an initial polymerization temperature not higher than approximately 225° F.

4. In a catalytic process for the polymerization of low-boiling olefin hydrocarbons heavier than ethylene, the improvement which comprises preparing a hydrous gel of silicic acid, treating said hydrous gel at least twice with an aqueous solution of a hydrolyzable salt of titanium, subsequent to each such treatment washing said treated gel with water to free it substantially of soluble ionic material, and finally drying said gel at a temperature not substantially higher than approximately 225° F. and to a water content such that the resultant material is adapted to polymerize low-boiling olefin hydrocarbons heavier than ethylene when present in a hydrocarbon mixture in a concentration between 15 and 40 per cent at a temperature between approximately 200° and approximately 225° F., and subsequently passing a hydrocarbon material containing low-boiling olefins heavier than ethylene, in an amount between 15 and 40 per cent thereof, over said catalyst at an initial polymerization temperature not higher than approximately 225° F.

5. In a catalytic process for the polymerization of low-boiling olefin hydrocarbons heavier than ethylene, the improvement which comprises preparing a hydrous gel of silicic acid, treating said hydrous gel at least twice with an aqueous solution of a hydrolyzable salt of zirconium, subsequent to each such treatment washing said treated gel with water to free it substantially of soluble ionic material, and finally drying said gel at a temperature not substantially higher than approximately 225° F. and to a water content such that the resultant material is adapted to polymerize low-boiling olefin hydrocarbons heavier than ethylene when present in a hydrocarbon mixture in a concentration between 15 and 40 per cent at a temperature between approximately 200° and approximately 225° F., and subsequently passing a hydrocarbon material containing low-boiling olefins heavier than ethylene, in an amount between 15 and 40 per cent thereof, over said catalyst at an initial polymerization temperature not higher than approximately 225° F.

6. In a catalytic process for the polymerization of low-boiling olefin hydrocarbons heavier than ethylene, the improvement which comprises preparing a hydrous acidic silica gel, treating said hydrous gel with an aqueous solution of aluminum sulfate, washing said treated gel with water, subjecting said washed gel to a second treatment with an aqueous solution of aluminum sulfate, washing said twice-treated gel substantially free of soluble ionic material, subjecting the resultant material to a preliminary drying at a temperature not substantially higher than approximately 225° F., and subsequently passing over said partially dried material in a polymerization catalyst chamber at a temperature not higher than approximately 225° F. a hydrocarbon charge stock comprising between 15 and 40 per cent of low-boiling olefin hydrocarbons to complete said drying and to initiate said polymerization.

7. In a constant-conversion catalytic process for the polymerization of low-boiling olefin hydrocarbons heavier than ethylene, in which the temperature of conversion is progressively increased as the catalyst progressively declines in activity in order to maintain the extent of conversion substantially constant, the improvement which comprises preparing a hydrous gel of silicic acid, treating said hydrous gel at least twice with an aqueous solution of a hydrolyzable salt of a metal selected from Groups IIIB and IVA of the periodic system, subsequent to each such treatment washing said treated gel with water to free it substantially of soluble ionic material and finally drying said gel at a temperature not substantially higher than approximately 225° F. and to a water content such that the resultant material is initially adapted to polymerize low-boiling olefin hydrocarbons heavier than ethylene when present in a hydrocarbon mixture in a concentration between 15 and 40 per cent at a temperature between approximately 200° and approximately 225° F., and subsequently passing a hydrocarbon material containing low-boiling olefins heavier than ethylene, in an amount between 15 and 40 per cent thereof, over said catalyst at an initial polymerization temperature not higher than approximately 225° F.

8. In a constant-conversion catalytic process for the polymerization of low-boiling olefin hydrocarbons heavier than ethylene, in which the temperature of conversion is progressively increased as the catalyst progressively declines in activity in order to maintain the extent of conversion substantially constant, the improvement which comprises preparing a hydrous gel of silicic acid, treating said hydrous gel at least twice with an aqueous solution of a hydrolyzable salt of aluminum, subsequent to each such treatment washing said treated gel with water to free it substantially of soluble ionic material and finally drying said gel at a temperature not substantially higher than approximately 225° F. and to a water content such that the material is initially adapted to polymerize low-boiling olefin hydrocarbons when present in a hydrocarbon mixture in a concentration between 15 and 40 per cent at a temperature between approximately 200° and approximately 225° F., and subsequently passing a hydrocarbon material containing low-boiling olefins heavier than ethylene, in an amount between 15 and 40 per cent thereof, over said catalyst at an initial polymerization temperature not higher than approximately 225° F.

9. In a constant-conversion catalytic process for the polymerization of low-boiling olefin hydrocarbons heavier than ethylene, in which the temperature of conversion is progressively increased as the catalyst progressively declines in activity in order to maintain the extent of conversion substantially constant, the improvement which comprises preparing a hydrous gel of silicic acid, treating said hydrous gel at least twice with an aqueous solution of a hydrolyzable salt of titanium, subsequent to each such treatment washing said treated gel with water to free it substantially of soluble ionic material and finally drying said gel at a temperature not substantially higher than approximately 225° F. and to a water content such that the material is initially adapted to polymerize low-boiling olefin hydrocarbons when present in a hydrocarbon mixture in a concentration between 15 and 40 per cent at a temperature between approximately 200° and approximately 225° F., and subsequently passing a hydrocarbon material containing low-boiling olefins heavier than ethylene, in an amount between 15 and 40 per cent thereof, over said catalyst at an initial polymerization temperature not higher than approximately 225° F.

10. In a constant-conversion catalytic process for the polymerization of low-boiling olefin hydrocarbons heavier than ethylene, in which the temperature of conversion is progressively increased as the catalyst progressively declines in activity in order to maintain the extent of conversion substantially constant, the improvement which comprises preparing a hydrous gel of silicic acid, treating said hydrous gel at least twice with an aqueous solution of a hydrolyzable salt of zirconium, subsequent to each such treatment washing said treated gel with water to free it substantially of soluble ionic material and finally drying said gel at a temperature not substantially higher than approximately 225° F. and to a water content such that the material is initially adapted to polymerize low-boiling olefin hydrocarbons when present in a hydrocarbon mixture in a concentration between 15 and 40 per cent at a temperature between approximately 200° and approximately 225° F., and subsequently passing a hydrocarbon material containing low-boiling olefins heavier than ethylene, in an amount between 15 and 40 per cent thereof, over said catalyst at an initial polymerization temperature not higher than approximately 225° F.

11. In a constant-conversion catalytic process for the polymerization of low-boiling olefin hydrocarbons heavier than ethylene, in which the temperature of conversion is progressively increased as the catalyst progressively declines in activity in order to maintain the extent of conversion substantially constant, the improvement which comprises preparing a hydrous acidic silica gel, treating said hydrous gel with an aqueous solution of aluminum sulfate, washing said treated gel with water, subjecting said washed gel to a second treatment with an aqueous solution of a hydrolyzable salt of said metal, washing said twice-treated gel substantially free of soluble ionic material, subjecting the resultant material to a preliminary drying at a temperature not substantially higher than approximately 225° F., and subsequently passing over said partially dried material in a polymerization catalyst chamber at a temperature not higher than approximately 225° F. a hydrocarbon charge stock comprising between 15 and 40 per cent of low-boiling olefin hydrocarbons to complete said drying and to initiate said polymerization process.

KARL H. HACHMUTH.